United States Patent Office 2,723,282
Patented Nov. 8, 1955

2,723,282

MANUFACTURE OF β-ALKOXY-α-ARYL-αβ-UNSATURATED NITRILES

Basil Hugh Chase and James Walker, London, England, assignors to National Research Development Corporation, London, England, a corporation of Great Britain No Drawing. Application November 28, 1952,
Serial No. 323,146

Claims priority, application Great Britain
December 6, 1951

11 Claims. (Cl. 260—465)

This invention relates to β-alkoxy-α-aryl-αβ-unsaturated nitriles.

According to the invention there is provided a process for the manufacture of such nitriles, which comprises reacting α-acyl-α-arylacetonitriles of the kind $$R \cdot CO \cdot CH(Aryl) \cdot CN$$

(where R is a hydrogen atom, a lower alkyl group having not more than four carbon atoms, or an aralkyl group), or equilibrium mixtures thereof with the tautomeric enolic forms $R \cdot C(OH):C(Aryl) \cdot CN$, with a primary or secondary alcohol having not more than twelve carbon atoms under water-removing conditions and in the presence of an acid catalyst and an organic solvent. Under the chosen conditions alcoholysis of the nitrile group does not interfere with the desired course of the reaction.

The water-removing conditions may be established by carrying out the reaction in an organic solvent which forms with water a heterogeneous azeotropic mixture having a boiling point lower than that of the alcohol employed. In this case, the reaction may be effected by heating the reaction mixture at the boiling point of the mixture and in such a manner that water only is removed therefrom, for example, by boiling under reflux. The period of heating depends upon the particular combination of α-acyl-α-arylacetonitrile, alcohol, solvent, and catalyst employed, and from a knowledge of the quantities of the reactants present the amount of water which will be formed during the reaction can be calculated. The boiling of the mixture under reflux is conveniently conducted in such a manner that the water formed can be segregated, only the organic solvent being allowed to return to the reaction mixture, and the amount of water formed at any stage of the reaction may be observed, thus enabling the point at which the reaction is completed to be determined. The reaction can, however, be stopped when it has proceeded to any desired extent.

Alternatively, the water-removing conditions may be established by the addition to the reaction mixture of a substance capable of combining or reacting with water and such that neither the added substance nor the product of its combination or reaction with water reacts with the starting materials, catalyst, or resultant β-alkoxy-α-aryl-αβ-unsaturated nitriles; under these conditions the solvent used need not be one which forms an azeotropic mixture with water, nor need the reaction be carried out at the boiling point of the mixture.

Suitable primary or secondary alcohols are, for example, ethanol, n-propanol, isopropanol, isobutanol, cyclohexanol, or lauryl alcohol.

The acid catalyst is preferably an organic sulphonic acid, for example, toluene-p-sulphonic acid, or an organic compound containing a free sulphonic acid group such, for example, as a sulphonted polystyrene resin.

Suitable organic solvents which are capable of forming a heterogeneous azeotropic mixture with water are, for example, hydrocarbon solvents such as toluene or benzene or halogenated organic solvents such as chloroform or carbon tetrachloride.

The quantity of alcohol employed relative to the amount of α-acyl-α-arylacetonitrile is preferably less than approximately two molecular proportions. Where a quantity of alcohol in excess of two molecular proportions is used, especially in the case of α-formyl-α-arylacetonitriles, the ββ-dialkoxy compound is sometimes produced and it is necessary to heat this with a further amount of the acid catalyst, either in the presence or absence of a solvent, in order to obtain the desired β-alkoxy-α-aryl-αβ-unsaturated nitriles. In the case of α-formyl-α-arylacetonitriles, for example, ββ-dialkoxy-α-arylpropionitriles are formed.

The β-alkoxy-α-aryl-αβ-unsaturated nitriles have applications, for example as intermediates in the production of compounds highly active in the treatment of malaria.

The process of the invention will now be illustrated by the following examples, the proportions being stated in parts by weight:

Example 1

In the preparation of β-isobutoxy-α-phenylacrylonitrile, a mixture of α-formylphenylacetonitrile (7.25 parts), isobutanol (7.4 parts), and toluene-p-sulphonic acid (0.1 part) in benzene is boiled under reflux in such a manner that only the organic solvent is allowed to return to the mixture and the water formed in the reaction is segregated. The course of the reaction may be noted by observing the amount of water formed. The cooled reaction mixture is washed with cold dilute aqueous caustic alkali solution and with water, dried, and fractionated, when the desired product is obtained as a colourless oil (9.1 parts), B. P. 119–120° C./0.1 mm.

Example 2

In the preparation of β-isobutoxy-α-phenylacrylonitrile, a mixture of α-formylphenylacetonitrile (96 parts), isobutanol (58 parts), toluene-p-sulphonic acid (10 parts), and toluene (400 parts) is boiled under reflux in the manner described in the preceding example until the anticipated amount of water is segregated. Isolation of the product in the customary way gives the desired material (114 parts).

Example 3

When a mixture of α-formylphenylacetonitrile (50 parts), isobutanol (60 parts), toluene-p-sulphonic acid (1 part) and benzene (450 parts) is submitted to the procedure described in Example 1, and the product is isolated in the manner outlined therein, ββ-diisobutoxy-α-phenylpropionitrile (56 parts) is obtained, having a B. P. 143–145° C./0.3 mm. The ββ-diisobutoxy-α-phenylpropionitrile (122 parts) is heated on a water-bath with toluene-p-sulphonic acid (10 parts) under slightly reduced pressure, the isobutanol being removed as it is formed. After the reaction is complete, the cooled residue is taken up in an organic solvent immiscible with water, washed with dilute aqueous alkali solution and with water, dried and fractionated, giving β-isobutoxy-α-phenylacrylonitrile (75 parts). The same result is achieved by boiling a benzene solution of the acetal under reflux with toluene-p-sulphonic acid.

Example 4

In the preparation of β-isobutoxy-α-p-chlorophenylacrylonitrile, a mixture of α-formyl-p-chlorophenylacetonitrile (20 parts), isobutanol (20 parts), toluene-p-sulphonic acid (1 part) and benzene (225 parts) is submitted to the process described in Example 1, and the product is isolated in the manner therein outlined, when the desired substance (21 parts) is obtained, having a B. P. 139–141° C./0.1 mm.

Example 5

In the preparation of β-isobutoxy-α-phenylcrotononitrile, a mixture of α-phenylacetoacetonitrile (50 parts), isobutanol (50 parts), toluene-p-sulphonic acid (1 part) and benzene (450 parts) is submitted to the procedure outlined in Example 1 and the product is isolated in any convenient manner, yielding the desired substance (65 parts), having a B. P. 120° C./0.005 mm.

Example 6

In the preparation of β-n-propoxy-α-phenylacrylonitrile, a mixture of α-formylphenylacetonitrile (7.25 parts), n-propanol (3.6 parts), toluene-p-sulphonic acid (2 parts), and benzene (150 parts) is submitted to the procedure outlined in Example 1 and the product is isolated in the customary manner, yielding the desired substance (8.6 parts), having a B. P. 123–126° C./0.6 mm.

Example 7

In the preparation of β-ethoxy-α-phenylacrylonitrile, a mixture of α-formylphenyl acetonitrile (7.25 parts), ethanol (3.45 parts), d-camphor-10-sulphonic acid (2 parts), and chloroform (150 parts) is submitted to the process outlined in Example 1 and the product is isolated in the customary manner, yielding the desired substance (5 parts), having a B. P. 124° C./1.6 mm.

Example 8

In the preparation of β-n-propoxy-α-phenylacrylonitrile, a mixture of α-formylphenylacetonitrile (7.25 parts), n-propanol (3.6 parts), and benzene (150 parts) is boiled under reflux with a ground sulphonated polystyrene resin (1 part) under the conditions outlined in Example 1. At the end of the reaction, the solution is filtered from the insoluble acid catalyst and fractionally distilled, yielding the desired substance (7.1 parts), having B. P. 145° C./2.0 mm.

Example 9

In the preparation of β-isopropoxy-α-phenylacrylonitrile, a mixture of α-formylphenylacetonitrile (7.25 parts), isopropanol (3.3 parts), toluene-p-sulphonic acid (0.9 part), and benzene (100 parts) is submitted to the procedure outlined in Example 1 and the product is isolated in the customary manner, yielding the desired substance (8.2 parts) having B. P. 122–126° C./0.5 mm.

Example 10

In the preparation of β-cyclohexyloxy-α-phenylacrylonitrile, a mixture of α-formylphenylacetonitrile (7.25 parts), cyclohexanol (6.0 parts), toluene-p-sulphonic acid (0.9 part), and toluene (100 parts) is submitted to the procedure outlined in Example 1 and the product is isolated in the customary manner, yielding the desired substance (10.4 parts), having B. P. 140–142° C./0.004 mm.

Example 11

In the preparation of β-lauryloxy-α-phenylacrylonitrile, a mixture of α-formylphenylacetonitrile (7.25 parts), lauryl alcohol (10.25 parts), toluene-p-sulphonic acid (0.9 part), and toluene (100 parts) is submitted to the procedure outlined in Example 1 and the product is isolated in the customary manner, yielding the desired substance (15.1 parts) having B. P. 185–190° C./0.002 mm.

Example 12

In the preparation of β-isobutoxy-β-ethyl-α-p-chlorophenylacrylonitrile, a mixture of α-propionyl-p-chlorophenylacetonitrile (5.2 parts), isobutanol (2.05 parts), toluene-p-sulphonic acid (0.5 part), and toluene (100 parts) is submitted to the procedure outlined in Example 1, and the product is isolated in the customary manner, yielding the desired substance (4.6 parts) having B. P. 140–142° C./0.3 mm.

Example 13

In the preparation of β-n-propoxy-α-phenylacrylonitrile, a mixture of α-formylphenylacetonitrile (7.25 parts), n-propanol (3.6 parts), toluene-p-sulphonic acid (0.9 part), anhydrous calcium sulphate (41 parts), and benzene (150 parts) is boiled under reflux with stirring. When the reaction is complete, the calcium sulphate is removed by filtration and the product isolated in the customary manner, yielding the desired substance (4.5 parts) having B. P. 120–124° C./0.15 mm.

Example 14

In the preparation of β-isobutoxy-α-phenylacrylonitrile, a mixture of α-formylphenylacetonitrile (7.25 parts), isobutanol (4.1 parts), toluene-p-sulphonic acid (0.9 part), and benzene (150 parts) is boiled under reflux in such a manner that the condensate passes over anhydrous calcium chloride before returning to the reaction vessel. Isolation of the product in the customary manner yields the desired substance (9.6 parts) having B. P. 112–114° C./0.005 mm.

We claim:

1. A process for the manufacture of beta-alkoxy-alpha-aryl-alpha, beta-unsaturated nitriles which comprises reacting (a) an alpha-acyl-alpha-aryl-acetonitrile capable of changing into a tautomeric enolic form with (b) an alcohol which has at least one hydrogen atom attached to the same carbon atom as its alcoholic hydroxyl group and which has not more than 12 carbon atoms, under water-removing conditions and in the presence of an acid catalyst and an organic solvent.

2. A process as defined in claim 1 wherein the water-removing conditions are established by carrying out the reaction in the presence of an organic solvent which forms with water a heterogeneous azeotropic mixture having a boiling point lower than that of the alcohol employed.

3. A process as defined in claim 2 wherein the reaction is effected by boiling under reflux.

4. A process as defined in claim 3 wherein the boiling under reflux is effected under the conditions wherein water formed during the reaction is segregated.

5. A process as defined in claim 1 wherein the water-removing conditions are established by the addition to the reaction mixture of a water-abstracting substance that is chemically indifferent to all the substances involved in the process other than water and which gives with water a similarly indifferent substance.

6. A process as defined in claim 2 wherein the alcohol is selected from the class consisting of ethanol, n-propanol, isopropanol, isobutanol, cyclohexanol and lauryl alcohol.

7. A process as defined in claim 2 wherein the acid catalyst is an organic compound containing at least one sulphonic acid group.

8. A process as defined in claim 5 wherein the acid catalyst is an organic compound containing at least one sulphonic acid group.

9. A process as defined in claim 2 in which the organic solvent is a hydrocarbon.

10. A process as defined in claim 2 in which the organic solvent is a halogenated hydrocarbon.

11. A process as defined in claim 2 in which the quantity of alcohol is not more than approximately two molecular proportions relative to the quantity of the alpha-acyl-alpha-aryl-acetonitrile.

References Cited in the file of this patent

UNITED STATES PATENTS 2,609,384    Russell et al. _____ Sept. 2, 1952

OTHER REFERENCES

Wislicenus et al.: Liebigs Ann., vol. 424, pp. 220–228 (1921).

Houben: Die Methoden der Org. Chem. (3rd ed.), vol. 3, pp. 133–137, 151 (1943).